US011878401B2

(12) United States Patent
Kohlschmied et al.

(10) Patent No.: US 11,878,401 B2
(45) Date of Patent: Jan. 23, 2024

(54) HANDHELD POWER TOOL

(71) Applicant: Hilti Aktiengesellschaft, Schaan (LI)

(72) Inventors: Frank Kohlschmied, Munich (DE); Markus Hartmann, Mauerstetten (DE)

(73) Assignee: Hilti Aktiengesellschaft, Schaan (LI)

( * ) Notice: Subject to any disclaimer, the term of this patent is extended or adjusted under 35 U.S.C. 154(b) by 461 days.

(21) Appl. No.: 17/026,744

(22) Filed: Sep. 21, 2020

(65) Prior Publication Data

US 2021/0001463 A1 Jan. 7, 2021

Related U.S. Application Data

(62) Division of application No. 15/027,198, filed as application No. PCT/EP2014/070312 on Sep. 24, 2014, now Pat. No. 10,814,467.

(30) Foreign Application Priority Data

Oct. 3, 2013 (EP) .................................... 13187203

(51) Int. Cl.
*B25D 11/00* (2006.01)
*B25D 16/00* (2006.01)

(52) U.S. Cl.
CPC ............ *B25D 11/005* (2013.01); *B25D 16/00* (2013.01); *B25D 2217/0015* (2013.01); *B25D 2217/0019* (2013.01); *B25D 2250/035* (2013.01)

(58) Field of Classification Search
CPC .................. B25D 11/005; B25D 16/00; B25D 2217/0015; B25D 2217/0019; B25D 2250/035; B25D 9/16; B25D 9/18; Y10T 137/8667; Y10T 137/86678; Y10T 137/86694; Y10T 137/86702; Y10T 137/8671; F15B 2211/40
See application file for complete search history.

(56) References Cited

U.S. PATENT DOCUMENTS 4,011,795 A * 3/1977 Barthe .................... F01L 23/00 91/286
4,066,136 A * 1/1978 Wanner .................. B25D 17/00 464/35
(Continued)

FOREIGN PATENT DOCUMENTS

CN 1915606 A 2/2007
EP 1226903 7/2002
(Continued)

*Primary Examiner* — Gloria R Weeks
*Assistant Examiner* — Mobeen Ahmed
(74) *Attorney, Agent, or Firm* — Davidson, Davidson & Kappel, LLC

(57) ABSTRACT

A handheld power tool 1 has a tool socket 2 to hold a tool along a working axis 11. A motor-driven, pneumatic striking mechanism 6 has an exciter 17 which is driven by a motor 5, a striker 14 that is coupled to the exciter 17 via a pneumatic chamber 19, and an intermediate striker 22 arranged on the working axis 11 in the striking direction 12 behind the striker 14. A ventilation opening 30 connects a cavity 29 situated between the striker 14 and the intermediate striker 22 to the environment. A valve 38 that closes the ventilation opening 30 is opened when actuated by the intermediate striker 22 when the intermediate striker 22 is moved into its working position counter to the striking direction 12.

22 Claims, 2 Drawing Sheets

(56) References Cited

U.S. PATENT DOCUMENTS 4,336,847 A * 6/1982 Ito .......................... B25D 16/00 173/118
4,567,951 A * 2/1986 Fehrle .................. B25D 17/245 173/117
4,611,670 A * 9/1986 Chromy ................. B25D 17/26 173/DIG. 3
5,052,498 A * 10/1991 Gustafsson .......... B25D 11/005 173/202
5,088,566 A * 2/1992 Gustafsson .......... B25D 11/005 173/206
5,099,926 A * 3/1992 Fushiya ............... B25D 11/005 173/17
5,456,324 A 10/1995 Takagi
5,775,440 A 7/1998 Shinma et al.
5,873,418 A * 2/1999 Arakawa ................ B25D 16/00 173/48
5,975,217 A * 11/1999 Frenzel ................ B25D 11/125 173/109
6,116,352 A * 9/2000 Frauhammer ........ B25D 11/005 173/48
6,119,796 A * 9/2000 Schmid ................ B25D 11/125 173/118
6,237,699 B1 * 5/2001 Plietsch ................. B25D 16/00 173/109
6,431,290 B1 8/2002 Muhr et al.
6,467,555 B2 10/2002 Plank et al.
6,675,908 B1 * 1/2004 Frauhammer ........ B25D 11/125 173/137
6,938,705 B2 * 9/2005 Kikuchi ............... B25D 11/005 173/210
7,726,414 B2 6/2010 Berger et al.
7,784,562 B2 * 8/2010 Ikuta ...................... B25D 17/24 173/48
7,806,201 B2 * 10/2010 Aoki ...................... B23D 51/16 173/210
8,087,474 B2 * 1/2012 Shinma ................ B25D 16/006 173/48
8,739,895 B2 6/2014 Hartmann et al.
9,044,847 B2 6/2015 Kohlschmied et al.
2002/0050365 A1 * 5/2002 Bongers-Ambrosius .................... B25D 11/04 173/128
2002/0108766 A1 * 8/2002 Plank ..................... B25D 17/06 173/171
2004/0177981 A1 * 9/2004 Berger ................. B25D 11/005 173/212
2006/0076154 A1 * 4/2006 Aoki .................... B25D 11/125 173/212
2006/0124333 A1 * 6/2006 Berger ................. B25D 11/125 173/201
2007/0039749 A1 * 2/2007 Aoki ...................... B25D 17/24 173/212
2009/0065226 A1 * 3/2009 John ...................... H02K 11/33 173/93
2009/0236110 A1 * 9/2009 Iwakami ................ B25D 17/06 279/19.3
2010/0193205 A1 * 8/2010 Cecchin ............... B25D 11/005 173/113
2010/0236802 A1 * 9/2010 Berger ................. B25D 11/064 173/118
2011/0303429 A1 * 12/2011 Kohlschmied ....... B25D 11/005 173/112
2011/0303430 A1 * 12/2011 Hartmann ............ B25D 17/245 173/112
2011/0303431 A1 * 12/2011 Hartmann .............. B25D 17/06 173/114
2012/0024555 A1 2/2012 Sugiyama
2013/0277080 A1 * 10/2013 Hartmann ............ B25D 17/245 173/212
2013/0319712 A1 * 12/2013 Massler ................. B25D 11/06 173/201
2013/0333904 A1 * 12/2013 Raggl .................. B25D 11/064 173/1
2013/0333909 A1 * 12/2013 Binder ................... H02K 33/12 173/117
2014/0138112 A1 * 5/2014 Takeuchi ............... B25D 16/00 173/122

FOREIGN PATENT DOCUMENTS

EP 1754575 2/2007
EP 2394793 12/2011
JP 2014008559 1/2014
WO WO2008/123255 10/2008

* cited by examiner

HANDHELD POWER TOOL

This is a divisional of U.S. patent application Ser. No. 15/027,198 filed Apr. 4, 2016 and is a National Phase application of PCT/EP2014/070312, filed Sep. 24, 2014, claiming priority to European patent application EP 13187203.8, filed Oct. 3, 2013. All of the above applications are hereby incorporated by reference herein.

The present invention relates to a handheld power tool, especially to a hammer drill or a demolition hammer, which automatically deactivates a pneumatic striking mechanism as soon as an idle strike occurs, as is known, for example, from U.S. Pat. No. 5,873,418.

SUMMARY OF THE INVENTION

The present invention provides a handheld power tool having a tool socket to hold a tool along a working axis. A motor-driven, pneumatic striking mechanism has an exciter which is driven by a motor, a striker that is coupled to the exciter via a pneumatic chamber, and an intermediate striker arranged on the working axis in the striking direction behind the striker. A ventilation opening connects a cavity situated between the striker and the intermediate striker to the environment. A valve that closes the ventilation opening is opened when actuated by the intermediate striker when the intermediate striker is moved into its working position counter to the striking direction. During normal operation, the ventilation opening ensures that the air being pushed along in front of the striker can flow away without any perceptible resistance and flows back without any perceptible resistance when the striker is pulled back. The resistance should be systematically increased when the handheld power tool is not in the working mode of operation. As soon as the user is no longer pressing the tool against the substrate, the intermediate striker can leave the working position and, as a result, can close the ventilation openings. Now the striking mechanism has to work against the air in front of the striker, losing power in the process.

In one embodiment, the valve has a closure element that can be moved along the working axis and that is exposed to a force generated by a spring in the striking direction. The intermediate striker can be in contact with the closure element counter to the striking direction. Preferably, the closure element has a sleeve situated inside the cavity, between the striker and the intermediate striker. In a first position in which the sleeve is clamped between the intermediate striker in its working position and the spring, said sleeve opens up the ventilation openings. In a second position that is further forward than the first position in the striking direction, the sleeve covers up the ventilation opening.

One embodiment provides for the intermediate striker to have a profiled circumferential surface with which the intermediate striker in its working position does not cover up the ventilation opening and, when moved out of its working position in the striking direction, does cover up the ventilation opening.

BRIEF DESCRIPTION OF THE DRAWINGS

The description below explains the invention on the basis of embodiments and figures provided by way of an example. The figures show the following.

Unless otherwise indicated, the same or functionally identical elements are designated in the figures by the same reference numerals.

DETAILED DESCRIPTION

Figure 1:
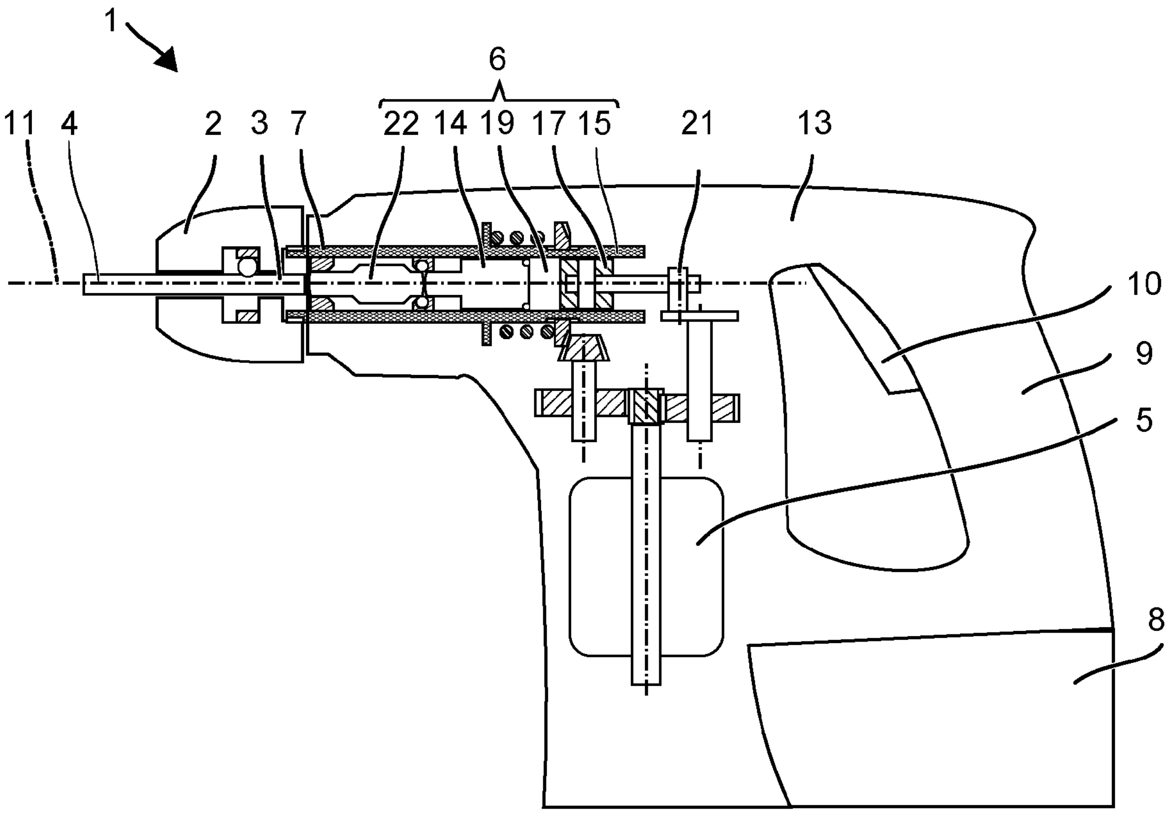
FIG. 1: a hammer drill.

FIG. 1 schematically shows a hammer drill 1 as an example of a handheld chiseling power tool. The hammer drill 1 has a tool socket 2 into which one shank end 3 of a tool, for example, the drill 4, can be inserted. The primary drive of the hammer drill 1 is in the form of a motor 5 which drives a striking mechanism 6 as well as a driven shaft 7. The motor 5 is supplied with power, for instance, by a battery pack 8. The user can guide the hammer drill 1 by means of a handle 9 and can put the hammer drill 1 into operation by means of a system switch 10. During operation, the hammer drill 1 continuously strikes the chisel 4 into a substrate in the striking direction 12 along the working axis 11. The striking mechanism 6 and preferably the additional drive components are accommodated inside a machine housing 13.

Figure 2:
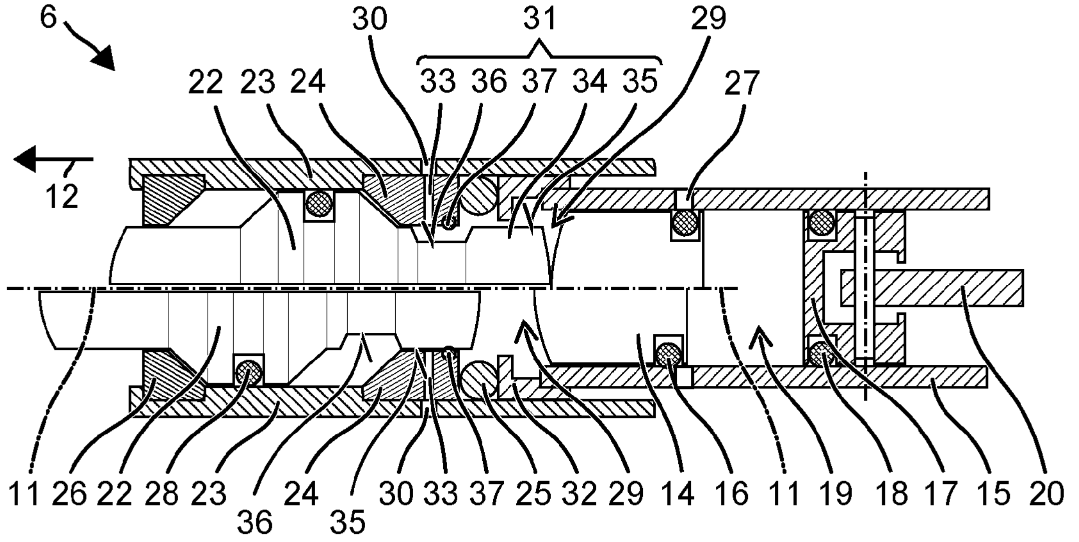
FIG. 2: a striking mechanism.

By way of an example, FIG. 2 shows a pneumatic striking mechanism 6 in a lengthwise sectional view. A striker 14 is guided along the working axis 11 in a strike tube 15. Together with the strike tube 15, the striker 14 creates a circumferential seal, and a gasket 16 on the circumference of the striker 14 preferably enhances the airtight closure. The exciter 17 is configured, for instance, as a piston that is arranged in the strike tube 15 in front of the striker 14 in the striking direction 12. Together with the strike tube 15, the exciter 17 likewise creates an air-tight circumferential seal, for example, enhanced by a gasket 18 in its circumferential surface. In the strike tube 15, the exciter 17 and the striker 14 close off a pneumatic chamber 19 between them. The exciter 17 is periodically moved by a motor back and forth along the working axis 11. The exciter 17 is coupled to an exciter wheel 21, for instance, by means of a connecting rod 20. The eccentric wheel 21 is driven by the motor 5. Instead of an eccentric wheel 21, for example, a toggle element can be coupled as the periodical drive to the exciter 17. The pneumatic chamber 19 is compressed and decompressed by the periodical movement of the exciter 17. The periodical air pressure changes then drive the striker 14.

The striker 14 strikes an intermediate striker 22 (striking pin) that is arranged on the working axis 11 beyond the striker 14 in the striking direction 12. The intermediate striker 22 is guided along the working axis 11 in a guide tube 23. The drill 4 or chisel can be movably guided in the tool socket 2 on the working axis 11 and, during operation, it is in contact with the intermediate striker 22 counter to the striking direction 12. The user or the intrinsic weight of the hammer drill 1 press the tool 4 onto the intermediate striker 22 counter to the striking direction 12. As a result, the intermediate striker 22 is brought into its working position in which the intermediate striker 22 is in contact with a stop 24 counter to the striking direction 12. The stop 24 can be fitted with a damping element 25. The striker 14 strikes the intermediate striker 22 in its working position. The working position is selected in such a way that the travel time of the striker 14 between two strikes and the periodical movement of the exciter 17 are synchronous. As soon as the user lifts the tool off the substrate, the return force that holds the intermediate striker 22 in its working position disappears. The intermediate striker 22 can slip out of its working position in the striking direction 12. Preferably, there is a catcher 26 against which the intermediate striker 22 comes to rest in the striking direction 12. Now the striker 14 does not hit the intermediate striker 22 in the strike point, as a result of which the travel time of the striker 14 increases relative to the periodical movement of the exciter 17. The pneumatic striking mechanism 6 tends to switch off. The striker 14 can advance in the striking direction 12 beyond its normal strike point and, in this process, it can open a ventilation opening 27 which then allows air from the environment to flow into the pneumatic chamber 19.

The strike tube 15 for the exciter 17 and for the striker 14 as well as the guide tube 23 for the intermediate striker 22 are connected to each other. The strike tube 15 is inserted into the guide tube 23. As an alternative or in addition, the tubes 15, 23 can be screwed, soldered or welded. Another embodiment provides for the strike tube 15 and the guide tube 23 to be made so as to be monolithically contiguous, that is to say, without a joint. The intermediate striker 22 has a gasket 28 in its circumference which is especially intended to prevent dust penetration. In this manner, the striker 14 and the intermediate striker 22 close off a cavity 29 in the tubes 15, 23 between them. The cavity 29 has one or more ventilation openings 30 that are situated in the strike tube 15 or in the guide tube 23. The volume of the cavity 29 changes periodically with the movement of the striker 14. In order to prevent the build-up of a counter force to the movement of the striker due 14 to the pressure in the cavity 29 during operation, the ventilation openings 30 vent the cavity 29 towards the environment. The environment is, for example, the interior of the machine housing 13 or outside of the handheld power tool 1. The ventilation openings 30 are arranged beyond the strike point of the striker 14 in the striking direction 12. The air pushed in front of the striker 14 can escape through the ventilation openings 30 during the entire movement of the striker 14. The ventilation openings 30 are situated in front of the gasket(s) 28 of the intermediate striker 22 in the striking direction 12 when the intermediate striker 22 is in its working position. The ventilation openings 30 are preferably radial holes in the tube 15, 23. Their short length reduces any throttling effect, thus ensuring an adequate flow rate. The ventilation openings 30 can also be configured so as to be channels, some of which run axially. The orifice facing inwards is arranged so as to open up into the cavity 29 as indicated above and, if applicable, the other orifice is axially offset.

The striking mechanism 6 has a valve 31 that closes off the ventilation openings 30 when the intermediate striker 22 is moved out of its working position. This forces the striker 14 to generate a force against the pressure conditions when it moves in the striking direction 12 as well as counter to the striking direction 12. The striker 14 slows down, as a result of which its travel time becomes additionally asynchronous relative to the periodical movement of the exciter 17. The movement of the intermediate striker 22 presumably takes place due to a straight strike by the striker 14. The striker 14 is thus still in the strike point when the valve 31 is closed by the intermediate striker 22. The pressure conditions in the cavity 29 adjoining the striker 14 hold the striker 14 in a position close to the strike point, for example, shifted in the striking direction 12 relative to the strike point. The striker 14 can be in contact with a catcher 32 in the striking direction 12.

In the two-part view, FIG. 2 shows at the top the intermediate striker 22 in its working position and at the bottom in a non-working position. The valve 31 has a channel 33 and a closure element 34. The channel 33 leads in the radial direction all the way to the intermediate striker 22. The closure element 34 is formed by the circumferential surface of the intermediate striker 22. In the striking direction 12, the circumferential surface consecutively has an annular first section 35 with a larger radius and an annular second section 36 with a smaller radius. When the intermediate striker 22 is in its working position, the first section 35 is in front of an orifice of the channel 33 in the striking direction 12, while the second section 36 is at the axial height of the orifice. The second section 36 and the orifice are radially at a distance from each other, so that air from the channel can enter into or exit from the cavity 29. If the intermediate striker 22 is moved out of its working position, then the first section 35 of the circumferential surface is in contact with the orifice of the channel 33. The radius of the first section 35 corresponds to the distance of the orifice relative to the working axis 11. The channel 33 is closed. The valve 31 seals off the cavity 29. The valve 31 can have a gasket 37 whose inner radius is equal to the radius of the first section 35 which is situated in front of the orifice in the striking direction 12.

Figure 3:
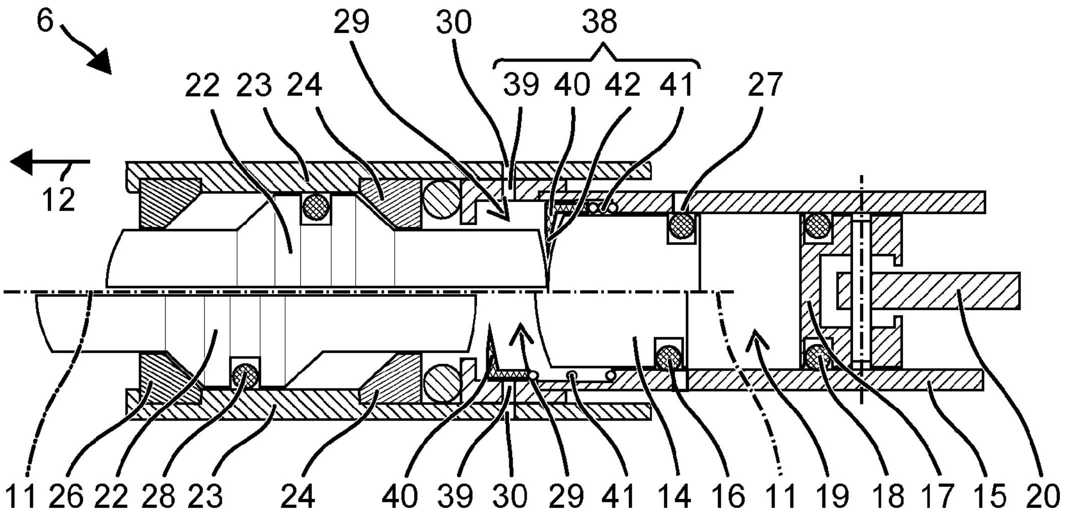
FIG. 3: a striking mechanism.

FIG. 3 shows a lengthwise section of the striking mechanism 6 with a differently designed the valve 38. The valve 38 is opened when the intermediate striker 22 is in its working position, and it is closed when the intermediate striker 22 is moved out of its working position in the striking direction 12. The cavity 29 between the striker 14 and the intermediate striker 22 is either vented or not vented by the ventilation openings 30, depending on the switching position of the valve 38. The valve 38 has a channel 39 whose orifice opens up into the cavity 29. A sleeve 40 forms the closure element of the valve 38. The sleeve 40 is arranged in the guide tube 23 and it can move along the working axis 11. A spring 41 presses the sleeve 40 in the striking direction 12. The sleeve 40 covers up the orifice of the channel 39, thereby closing off the valve 38. The valve 38 is self-closing. The sleeve 40 has a collar 42 that projects radially inwards. The intermediate striker 22 is in contact with the collar 42 counter to the striking direction 12. The intermediate striker 22 moves pushes the sleeve 40 against the force of the spring 41 in order to reach its working position. The sleeve 40 is offset relative to the orifice of the channel 39 counter to the striking direction 12 when the intermediate striker 22 is in its working position. The orifice is exposed and the cavity 29 is vented via the valve 38.

Figure 4:
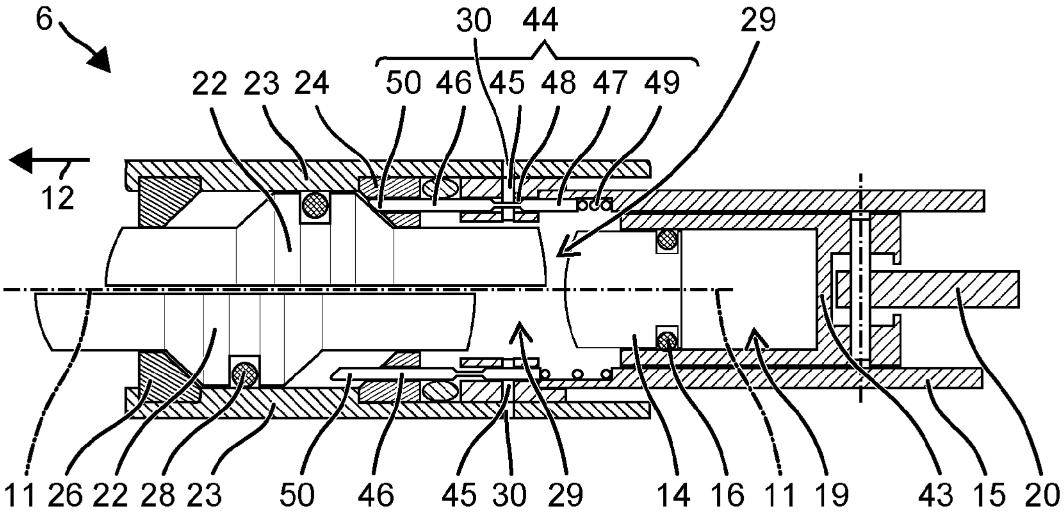
FIG. 4: a striking mechanism.

FIG. 4 shows another variant. The striking mechanism 6 has, for instance, a pot-shaped exciter 43. The exciter 43 has a cylindrical interior which is open in the striking direction 12 and into which the striker 14 is inserted. The pneumatic chamber 19 is the interior that is closed off by the striker 14. As in the preceding embodiments, the strike point of the striker 14 is defined by the intermediate striker 22. The cavity 29 situated between the striker 14 and the intermediate striker 22 is provided with the ventilation openings 30 in order to allow pressure equalization of the cavity 29 relative to the environment during operation of the striking mechanism 6. A valve 44 closes off the ventilation openings 30, except when the intermediate striker 22 is in contact with the stop 24, that is to say, when it is in its working position. The valve 44 has a channel 45 that adjoins the ventilation opening 30. An actuating rod 46 forms a closure element of the valve 44. The actuating rod 46 can move parallel to the working axis 11 and it runs through the channel 45. The actuating rod 46 has a thicker section 47 that can completely close off the channel 45, and an adjoining section 48 that tapers in the striking direction 12 and that can only partially close off the channel 45. A spring 49 presses the actuating rod 46 in the striking direction 12. The valve 44 is self-closing since the spring 49 positions the thicker section 47 in the channel 45. A tip 50 of the actuating rod 46 facing the striking direction 12 protrudes into the guide of the intermediate striker 22. When the intermediate striker 22 is in its working position, it pushes the actuating rod 46 against the force of the spring 49. In this process, the tapered section 48 is in the channel 45 so that air can flow around the actuating rod 46.

What is claimed is:

1. A handheld power tool comprising:

a tool socket for holding a tool along a working axis;

a motor-driven, pneumatic striking mechanism having an exciter driven by a motor, a striker coupled to the exciter via a pneumatic chamber, and an intermediate striker arranged on the working axis in a striking direction, the striker being located between the exciter and the intermediate striker on the working axis and striking the intermediate striker in a working position, the intermediate striker being monolithic;

a ventilation opening connecting a cavity situated between the striker and the intermediate striker to the environment; and a valve allowing closing and opening of the ventilation opening and being opened when the intermediate striker is moved into the working position counter to the striking direction;

the intermediate striker having a profiled circumferential surface, so that the intermediate striker in the working position does not cover up the ventilation opening and, when moved out of the working position in the striking direction, does cover the ventilation opening.

2. The handheld power tool as recited in claim 1 wherein the valve has a channel leading in a radial direction all the way to the intermediate striker, and a closure element defined by a circumferential surface of the intermediate striker.

3. The handheld power tool as recited in claim 2 wherein proceeding in the striking direction, the circumferential surface of the intermediate striker consecutively has an annular first section with a first radius and an annular second section after the first annular second section with a second radius smaller than the first radius.

4. The handheld power tool as recited in claim 3 wherein when the intermediate striker is in the working position, the first section is axially spaced from an orifice of the channel facing the intermediate striker, while the second section is at the axial location of but spaced radially from the orifice at a distance from each other, so that air from the channel can enter into or exit from the cavity.

5. The handheld power tool as recited in claim 4 wherein when the intermediate striker is moved out of the working position in the striking direction, the first section of the circumferential surface is in contact with the orifice of the channel so the valve seals off the cavity.

6. The handheld power tool as recited in claim 5 wherein the valve has a gasket on a valve surface facing the working axis.

7. The handheld power tool as recited in claim 5 wherein a radius of the first section corresponds to a distance of the orifice relative to the working axis.

8. The handheld power tool as recited in claim 3 wherein the valve has a gasket with an inner radius equal to the first radius.

9. The handheld power tool as recited in claim 1 wherein proceeding in the striking direction, a circumferential surface of the intermediate striker consecutively has an annular first section with a first radius and an annular second section after the first annular second section with a second radius smaller than the first radius.

10. The handheld power tool as recited in claim 9 wherein when the intermediate striker is in the working position, the first section is axially spaced from an orifice of the channel facing the intermediate striker, while the second section is at the axial location of but spaced radially from the orifice at a distance from each other, so that air from the channel can enter into or exit from the cavity.

11. The handheld power tool as recited in claim 10 wherein when the intermediate striker is moved out of the working position in the striking direction, the first section of the circumferential surface is in contact with the orifice of the channel so the valve seals off the cavity.

12. The handheld power tool as recited in claim 1 wherein the valve has a gasket on a valve surface facing the working axis.

13. The handheld power tool as recited in claim 1 further comprising a guide tube for the intermediate striker, the guide tube having the ventilation opening.

14. The handheld power tool as recited in claim 13 wherein the valve has a channel leading in a radial direction all the way to the intermediate striker, and a closure element defined by a circumferential surface of the intermediate striker.

15. The handheld power tool as recited in claim 13 wherein the ventilation opening is a radially extending hole.

16. The handheld power tool as recited in claim 13 further comprising a strike tube for the striker, the strike tube being inserted into the guide tube.

17. The handheld power tool as recited in claim 16 wherein valve seals off the cavity by connecting guide tube and the strike tube.

18. The handheld power tool as recited in claim 13 wherein proceeding in the striking direction, a circumferential surface of the intermediate striker consecutively has an annular first section with a first radius, an annular second section after the first annular second section with a second radius smaller than the first radius, and an annular third section having a third radius larger than the first radius.

19. The handheld power tool as recited in claim 18 wherein when the intermediate striker is in the working position, the first section is axially spaced from an orifice of the channel facing the intermediate striker, while the second section is at the axial location of but spaced radially from the orifice at a distance from each other, so that air from the channel can enter into or exit from the cavity, and the third section is in contact with an inner surface of the guide tube.

20. The handheld power tool as recited in claim 1 further comprising a further ventilation opening, the striker capable of, in the striking direction beyond a normal strike point, opening the further ventilation opening to allow air from the environment to flow into the pneumatic chamber.

21. The handheld power tool as recited in claim 20 further comprising a strike tube for the striker, the strike tube having the further ventilation opening.

22. The handheld power tool as recited in claim 21 further comprising a guide tube for the intermediate striker, the guide tube having the ventilation opening, the striker tube being inserted into the guide tube.

* * * * *